3,482,403
CORNER INLET BLOWOUT DOME
Albert S. Polk, Jr., Baltimore, Md., assignor, by mesne assignments, to the United States of America as represented by the Secretary of the Navy
Filed Apr. 8, 1968, Ser. No. 719,631
Int. Cl. F02k 9/06
U.S. Cl. 60—245     3 Claims

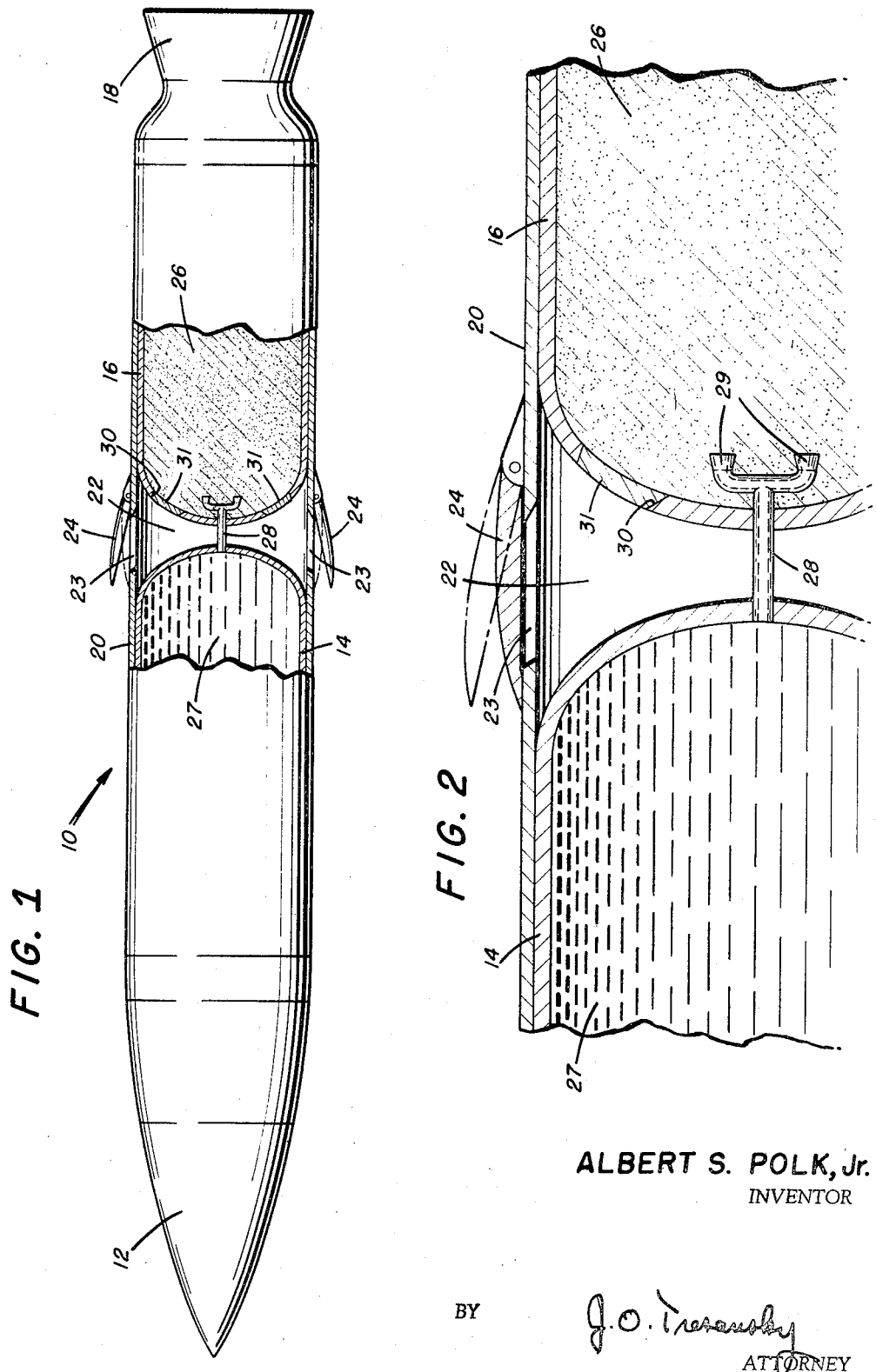

ABSTRACT OF THE DISCLOSURE

The present invention relates generally to an integral rocket-ramjet vehicle of the type employing a tandem arrangement of a liquid fuel tank, a solid fuel rocket, and air inlet ducts that admit air to the interior of the casing of the rocket after the solid fuel therein has burned. More particularly, the invention relates to the combination with such an integral rocket-ramjet vehicle of displaceable covers for interrupting air flow to the rocket casing until the solid fuel therein has been completely burned, when said covers will be blown into the casing by air entering through the ducts and ejected from the rocket nozzle upon burning in the casing of a mixture of said air and atomized fuel from the liquid fuel tank to produce thrust.

BACKGROUND AND BRIEF SUMMARY OF THE INVENTION

Various combinations of rocket and ramjet engines incorporate tandemly arranged forward and aft fuel chambers wherein the aft fuel chamber, after functioning as a rocket fuel container, is vented to the atmosphere and acts as a ramjet combustion chamber. The present invention generally relates to such a rocket-ramjet combination and more particularly to simplified means for preventing premature communication of the aft fuel chamber with the atmosphere. Specifically, the instant invention provides displaceable covers for ducts which channel air from scoops on the engine to the combustion chamber.

A typical combination rocket and ramjet power plant is shown in U.S. Patent No. 3,038,408, and comprises, in part, a frame arranged transversely of an axial air passage extending through the missile body. Said frame is provided with openings adapted to be closed by hinged doors or valves. During rocket propulsion, the frame closes off the combustion chamber from said air passage and the rest of the missile. On opening the doors or valves by swinging them rearwardly on their hinges, the openings to the air passages are uncovered and the same combustion chamber is employed for ramjet operation. Another rocket-ramjet combination is shown in U.S. Patent No. 2,912,820, wherein the engine has two chambers separated by a partition which changes its state, i.e., burns, melts and vaporizes, at the temperatures at which the rocket fuel burns. The partition is destroyed by the rocket heat and allows both chambers to function as a ramjet engine.

The principal object of the present invention is to provide, in a combined rocket-ramjet engine, duct covering means having no interdependent moving parts, the covers employed being displaced from their covering positions by air entering the ducts, with the result that no hinge failures or incomplete disintegration of material can foul the air flow to the ramjet combustion chamber.

Further objects and attendant advantages of the invention will become more readily apparent from the following description of the preferred embodiment.

BRIEF DESCRIPTION OF THE DRAWINGS

FIG. 1 is a longitudinal section, partly in elevation, illustrating the invention; and FIG. 2 is an enlarged detail section through the amidships portion of the engine.

DETAILED DESCRIPTION OF THE INVENTION

Referring to the drawings in more detail, the rocket-ramjet engine is shown generally at 10. The engine 10 comprises a nose section 12 of ojive shape, a liquid fuel tank section 14 aft of the nose section, and a rocket section 16 aft of the fuel tank. As will be seen, the nose section, tank section and the rocket section are arranged in tandem relationship. At its aft end, the rocket section is provided with the usual discharge nozzle 18 and the tank and rocket sections are connected by an outer wall 20 which defines a body and an air chamber 22 between the tan and the rocket sections. Air inlet openings 23 are formed in the wall of the body and communicate with the chamber 22.

Pivotally mounted on the body outwardly of the chamber 22 and in cooperative relation with the inlet openings 23 are scoops 24. The scoops are movable, by suitable remotely controlled mechanisms (not shown), from closed positions interrupting air flow to the chamber 22 to open positions admitting air to said chambers.

The rocket section 16 contains solid fuel 26 whereas the tank section 14 contains liquid fuel 27. Liquid fuel is conducted to the interior of the rocket section by a conduit 28 which has an injector 29 mounted on its inner end and within said rocket section. As will be clear from a scrutiny of FIG. 2, liquid fuel flow into the rocket section 16 is prevented so long as unburned solid fuel remains therein.

The forward end of the rocket section 16 is of generally hemispherical shape and is formed with openings 30 which communicate between the chamber 22 and the interior of the rocket section. Closing the openings 30 are displaceable covers 31 which are held in place by the solid fuel 26. As will be seen, the covers 31 are of arcuate contour and are disposed generally to confront the inlet openings 23. The edges of the covers are tapered inwardly toward their forward ends, to permit easy displacement of said covers from the openings 30, as will be described hereinafter.

In operation, the solid fuel 26 of the rocket section 16 is first ignited, by suitable means well-known in the art, for imparting initial thrust to the engine 10. During burning of the solid fuel 26, the scoops 24 will be maintained in their closed positions, as shown in FIG. 2, and no air will be admitted to the chamber 22.

Upon completion of the burning of the solid fuel 26, the internal pressure on the covers 31 that initially retains said covers in position will be relieved and, at the same time, the scoops 24 will be moved to open positions and the injector 29 will be uncovered for permitting fuel to flow into the now empty rocket section 16. Air flowing into the chamber 22 will impinge on the covers 31 for blowing them into the rocket for ejection through the nozzle thereof. Air will thus be admitted to the interior of the rocket section and will mix with the fuel flowing from the uncovered injector. Residual heat in the empty rocket section will be sufficient to ignite this fuel-air mixture for creating thrust at the nozzle 18. The engine 10 will thus operate as a ramjet and will continue to do so as long as fuel remains in the tank section 14.

I claim:
1. A combination rocket-ramjet engine having a body and a nose section on the body,
    a fuel tank section in the body aft of the nose section and having liquid fuel therein,
    a rocket section in the body aft of the fuel tank section and having solid fuel therein, the burning of said fuel producing initial thrust for the engine, said fuel tank section being spaced from said rocket section and said sections cooperating with the body to define an air chamber and said air chamber having inlet openings, means on the body and being movable from positions interrupting air flow through the inlet openings to positions admitting air to said air chamber through said openings, displaceable covers on the rocket section and confronting the air chamber, and means for conducting fuel from the tank section to the rocket section, said means including an injector, said solid fuel initially retaining said covers in position and interrupting fuel flow from the injector, and the completion of burning of said solid fuel relieving pressure in the rocket section and uncovering the injector whereby the covers will be displaced and fuel and air admitted to said rocket section for mixing and burning therein to produce ramjet thrust.

2. The invention recited in claim 1, wherein said first mentioned means comprises scoops.

3. The invention recited in claim 1, wherein said covers are of arcuate contour and are provided with edges that are tapered inwardly toward their forward ends.

References Cited

UNITED STATES PATENTS

| | | | |
|---|---|---|---|
| 2,912,820 | 11/1959 | Whitmore | 60—245 |
| 2,948,112 | 8/1960 | Smith | 60—244 |
| 3,038,408 | 6/1962 | Kluge | 60—244 |
| 3,086,359 | 4/1963 | Davis | 60—244 |

CARLTON R. CROYLE, Primary Examiner

D. HART, Assistant Examiner

U.S. Cl. X.R.

60—270